United States Patent [19]
Golden

[11] Patent Number: 5,377,230
[45] Date of Patent: Dec. 27, 1994

[54] EXTENDED BANDWIDTH TRANSMITTER FOR CROSSTALK CHANNELS

[75] Inventor: Glenn D. Golden, Tinton Falls, N.J.
[73] Assignee: AT&T Corp., Murray Hill, N.J.
[21] Appl. No.: 876,985
[22] Filed: May 1, 1992
[51] Int. Cl.$^5$ .................................... H04L 25/03
[52] U.S. Cl. ................................ 375/60; 375/12
[58] Field of Search ............... 379/406, 410, 411, 3; 370/32.1; 375/59, 60, 8, 14, 58, 62, 99, 38, 11, 12; 333/18, 28 R; 364/724.2

[56] References Cited

U.S. PATENT DOCUMENTS

| | | | |
|---|---|---|---|
| 4,079,355 | 3/1978 | Van der Gaag | 375/62 |
| 4,745,622 | 5/1988 | Gupta | 375/60 |
| 4,881,241 | 11/1989 | Pommier et al. | 375/38 |
| 5,095,495 | 3/1992 | Golden | 375/14 |
| 5,163,044 | 11/1992 | Golden | 370/32.1 |

OTHER PUBLICATIONS

"Exploitation of Spectral Redundancy in Cyclostationary Signals", by William A. Gardner, IEEE Signal Processing Magazine, Apr. 1991.
"Minimum Mean Square Euqalization in Cyclostationary and Stationary Interference-Analysis and Subscriber Line Calculations", by Brent R. Petersen, et al., IEEE Journal on Selected Areas in Communications, vol. 9, No. 6, Aug. 1991.
"Suppression of Near-and Far-End Crosstalk by Linear Pre-and Post-Filtering", by Michael L. Honig, et al., IEEE Journal On Selected Areas in Communications, vol. 10, No. 3, Apr. 1992.
"Equalization in Cyclostationary Interference" by Brent R. Petersen, PhD. Thesis submitted to the Faculty of Graduate Studies and Research, Ottawa-Carleton Institute for Electrical Engineering, Ottawa, Ontario, Canada, Oct. 31, 1991.

*Primary Examiner*—Tesfaldet Bocure
*Attorney, Agent, or Firm*—Joseph J. Opalach

[57] ABSTRACT

In many data communications systems, crosstalk is a significant channel impairment. If all transmitters in such a system must utilize the same shaping function, and if the transmitters are furthermore nominally Nyquist bandlimited, then the crosstalk generally cannot be mitigated by equalization. However, by extending the bandwidth of the transmitted signal in accordance with the principles of the invention, the resultant crosstalk can be efficiently mitigated by equalization. This extended bandwidth signal is produced by adding significant additional energy outside the traditional Nyquist band.

12 Claims, 5 Drawing Sheets

EXTENDED BANDWIDTH TRANSMITTER FOR CROSSTALK CHANNELS

BACKGROUND OF THE INVENTION

The present invention relates to techniques used in data communications for mitigating the effects of crosstalk in communications channels.

Crosstalk is the unintentional coupling of signals in a communications system. In many communications systems, crosstalk is a significant impediment to reliable transmission. For example, telephone service to the home is typically provided over a simple 'twisted pair' of wires, often referred to as a 'loop'. A particular customer's loop is typically bundled with loops of other nearby customers in a common cable. The proximity of the loops within the cable results in electromagnetic coupling between the loops. If the coupling is sufficiently strong, it is possible for the voice signals on one user's loop to interfere with the intelligibility of conversations on other users' loops.

The degree of coupling between loop pairs within the cable increases with frequency, and generally speaking, at the low frequencies used for voice transmission, objectionable crosstalk between telephone loops is not a significant problem. Even modems which transmit data using signals in the voice-frequency band (at rates up to approximately 24 kbps) are not seriously affected by cable crosstalk. However, there are several applications presently under consideration for which unloaded bundled telephone loops or other twisted-pair cables would be used to provide megabit-per-second (and higher) data transport. At the high signaling rates necessary for these applications, crosstalk is the dominant impairment to reliable transmission.

Data signals generated by many commonly employed forms of linear modulation are known as cyclostationary signals. For example, see "Exploitation of Spectral Redundancy in Cyclostationary Signals, W. A. Gardner, IEEE Signal Processing Magazine, vol. 8, no. 2, pp. 14–36, April 1991. Thus, assuming such modulation techniques are used in the applications mentioned above, both the desired data signal and the crosstalk signals are cyclostationary. It has been realized that the effects of crosstalk among mutually interfering cyclostationary signals can be reduced by employing an adaptive fractionally-spaced equalizer (FSE) at the data receiver. For example, see "Minimum Mean-Square Equalization in Cyclostationary and Stationary Interference Analysis and Subscriber-Line Calculations," B. R. Petersen and D. D. Falconer, IEEE J. on Select. Areas Commun., August 1991; "Equalization in Cyclostationary Interference", B. R. Petersen, Ph.D. thesis, Oct. 31, 1991, Carleton University, Ottawa, Canada. The degree to which an FSE can mitigate the crosstalk depends strongly on the spectral relationships between the desired signal and the crosstalk signal at the input to the FSE; these spectral relationships in turn depend on the spectra of the transmitters. Furtherefore, for reasons of practical simplicity, it is desirable to impose the constraint that each transmitter use the same shaping function. Consequently, an important practical issue for these applications is to determine the particular transmitter spectral shaping function to be used for a given channel. For example, see "Suppression of Nearand Far-End Crosstalk by Linear Pre- and Post-Filtering", M. L. Honig, P. Crespo, and K. Steiglitz, IEEE J. on Select. Areas Commun., April 1992.

For the 'classical' linear communications channel in which only noise, but not crosstalk, is present, the optimum transmitter shaping function under the minimum mean-squared error (MMSE) criterion has Nyquist spectral support. However, it is generally appreciated that the optimum MMSE transmitter for mitigation of crosstalk under the above constraints requires a transmitted spectral support greater than the Nyquist rate. This type of transmitter will be referred to as an 'extended bandwidth' (EBW) transmitter. Unfortunately, analyses and simulations of crosstalk systems in the known prior art have provided no known general solution to the design of the spectral shapes for EBW transmitters which realize the near-optimum performance that is theoretically possible.

SUMMARY OF THE INVENTION

An EBW transmitter can be implemented in a simple and general way, which realizes near-optimum performance over a broad range of channels qualitatively similar to the twisted-pair cable. Specifically, it is necessary to employ EBW transmitters which utilize distinct energy regions, resulting in transmit filtering arrangements for crosstalk channels which axe qualitatively dissimilar to transmitters for the classical noise-only channel.

In an embodiment of the invention, transmitted data signals present on each of the loops within the cable axe cyclostationary signals having the same symbol rate. A certain Nyquist band within the passband of the system is called Region I. The interference to a transmitted signal due to crosstalk from another transmitted signal within the same cable is significant only over a portion of Region I, this portion referred to as Region Ib, or the 'crosstalk-dominant' region. Another Nyquist band within the passband of the system is known as Region II. A subset of Region II, referred to as Region IIb, is comprised of the set of frequencies within Region II which are Nyquist translates of the frequencies contained in Region Ib. In accordance with the invention, an extended bandwidth transmitter is practically implemented by providing substantial transmitter energy in Region I and in Region IIb. As a result, equalization of a received signal that comprises energy from both Region I and Region IIb, in accordance with U.S. Pat. No. 5,095,495, issued to G. D. Golden on Mar. 10, 1992, results in a significant mitigation of the crosstalk, even though the direct-channel and crosstalk transfer functions may not be known precisely. For example, in comparison to previous approaches using ad-hoc transmitter designs, an improvement of several dB can be achieved.

The performance improvement actually obtained over a given channel is strongly affected by the bandwidth of Region IIb. A feature of the invention is that this parameter is adjustable in a simple manner, facilitating straightforward adaptive minimization of the mean-squared error when operating over unknown channels.

DETAILED DESCRIPTION

Figure 1:
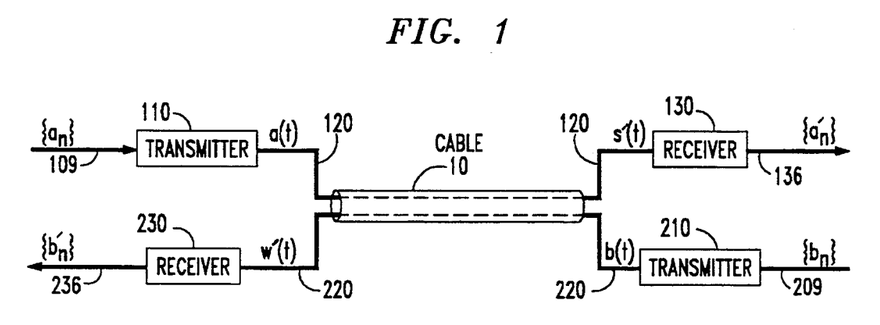
FIG. 1 is a block diagram of a communications network.

An illustrative communications network is shown in FIG. 1. The structure and operation of both the transmitters and receivers of FIG. 1 are well-known and will not be described in detail. For generality, all symbols, channel impulse responses, and signals are assumed to be complex-valued. References to power spectra and other frequency domain transfer functions are with respect to the one-sided, or analytic, equivalent channel.

A sequence of data symbols $\{a_n\}$ is applied to transmitter 110 at symbol rate (or 'baud rate') $1/T$ symbols per second. Transmitter 110 forms signal $a(t)$ which is transmitted via wire-pair channel 120, to receiver 130. Similarly, transmitter 210 forms signal, $b(t)$, representative of data symbol sequence $\{b_n\}$ also at baud rate $1/T$ symbols per second, which is transmitted to receiver 230 via wire-pair channel 220. Wire-pair channels 120 and 220 are contained within cable 10. It is assumed that channels 120 and 220 are proximately located within cable 10 and as such are subject to substantial crosstalk interference from one another.

The output of channel 120 is received signal $s'(t)$, and similarly the output of channel 220 is received signal $w'(t)$. Because of the coupling between the channels 120 and 220, the received signals $s'(t)$ and $w'(t)$ each contain energy due to both transmitted signals $a(t)$ and $b(t)$. However, the coupling between the channels varies with frequency: At very low frequencies, the coupling between the channels is weak, but the coupling increases steadily with frequency. Thus, at very low frequencies the crosstalk energy in each received signal is negligible, while at very high frequencies the crosstalk is considerable. In the context of this example, it is assumed that both transmitters 110 and 210 are transmitting in the mega-symbols-per-second range so that the degree of crosstalk is significant.

Receiver 130 operates on signal $s'(t)$, to provide an output symbol sequence, $\{a_n\}$, which is an estimate of the transmitted symbol sequence $\{a_n\}$. Receiver 230 similarly operates on signal $w'(t)$ to produce output symbol sequence $\{b_n\}$, an estimate of the transmitted sequence $\{b_n\}$.

It should be noted that crosstalk may be characterized as near-end crosstalk (NEXT) or far-end crosstalk (FEXT). In the communications system shown in FIG. 1, the crosstalk is depicted as near-end crosstalk, that is, crosstalk induced into a receiver by a transmitter located at the same end of the communications channel as the receiver.

Figure 2:
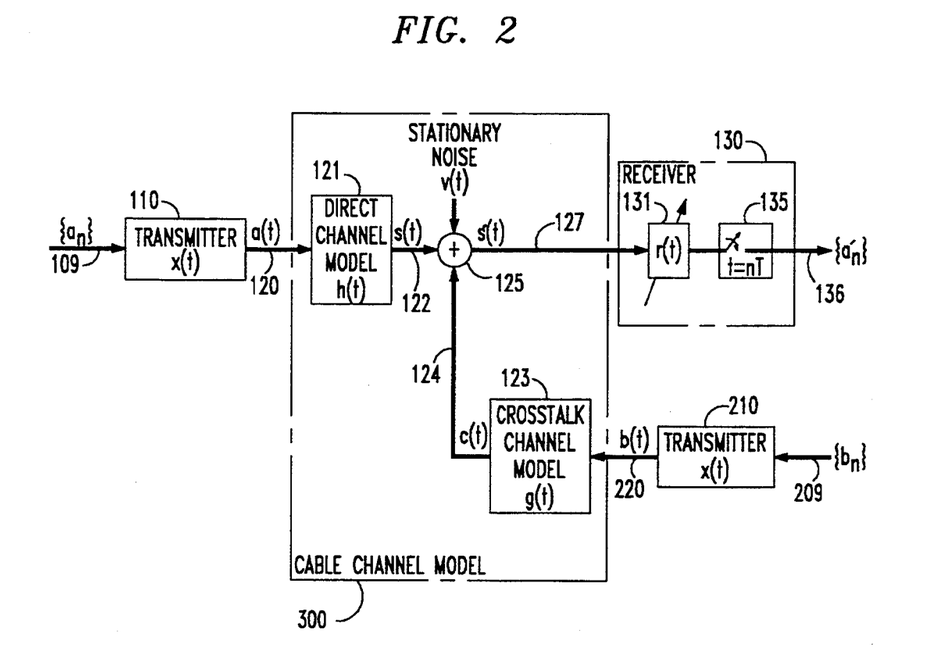
FIG. 2 is a block diagram of a portion of the communications network of FIG. 1 relating to crosstalk present on the communications system comprising channel 120.

The communications network of FIG. 1 is redrawn in FIG. 2 to further illustrate the effects of crosstalk on receiver 130. It is assumed that there is approximate symmetry among the communications systems utilizing cable 10, so that a similar analysis applies to the effects of crosstalk on the receiver 230 well.

Transmitter 110 has impulse response $x(t)$, and operates on symbol sequence $\{a_n\}$ to provide signal $$a(t) = \sum_{-\infty}^{\infty} a_n x(t - nT)$$

to channel 120. Recall that for practical reasons, it is desired that each transmitter utilize the same transfer function $x(t)$. Thus, transmitter 210, operating on symbol sequence $\{b_n\}$ provides signal $$b(t) = \sum_{-\infty}^{\infty} b_n x(t - nT)$$

to channel 220. It is further assumed that the symbol sequences are each zero-mean, uncorrelated, and that they have zero cross-correlation as well, i.e.

$$<a_n> = <b_n> = 0$$

$$<a_n a_{n-j}^*> = <b_n b_{n-j}^*> = 0, j \neq 0 \quad (1)$$

$$<a_{n-j} b_{n-j}^*> = 0 \ \forall i,j$$

where * denotes complex conjugate, and $<\cdot>$ indicates expectation over n.

Cable channel model 300 models the relevant effects of both the direct path from transmitter 110 to receiver 130, and the crosstalk from transmitter 210 to receiver 130, as follows: The direct path from transmitter 110 to receiver 130 is modeled by transfer function $h(t)$, which is representative of the effect of communications channel 120 on transmitted signal $a(t)$ only. The crosstalk path from transmitter 210 to receiver 130 is modeled by transfer function $g(t)$, which is representative of the crosstalk from channel 220 into channel 120, and is primarily a result of capacitive coupling between the channels due to their proximity within cable 10. Equivalent channel model 300 also includes additive stationary noise $v(t)$ with power spectral density $N_0$. (In practice, the source of such stationary or quasi-stationary noise would more likely be the receiver itself rather than the channel, but incorporating the noise source into the channel model is common practice in the analysis of such systems.) The overall signal reaching receiver 130 is thus comprised of the sum of the direct channel signal, $s(t)$, the crosstalk signal $c(t)$, and the stationary noise $v(t)$, that is $$s'(t) = s(t) + c(t) + v(t). \quad (2)$$

Figure 3:
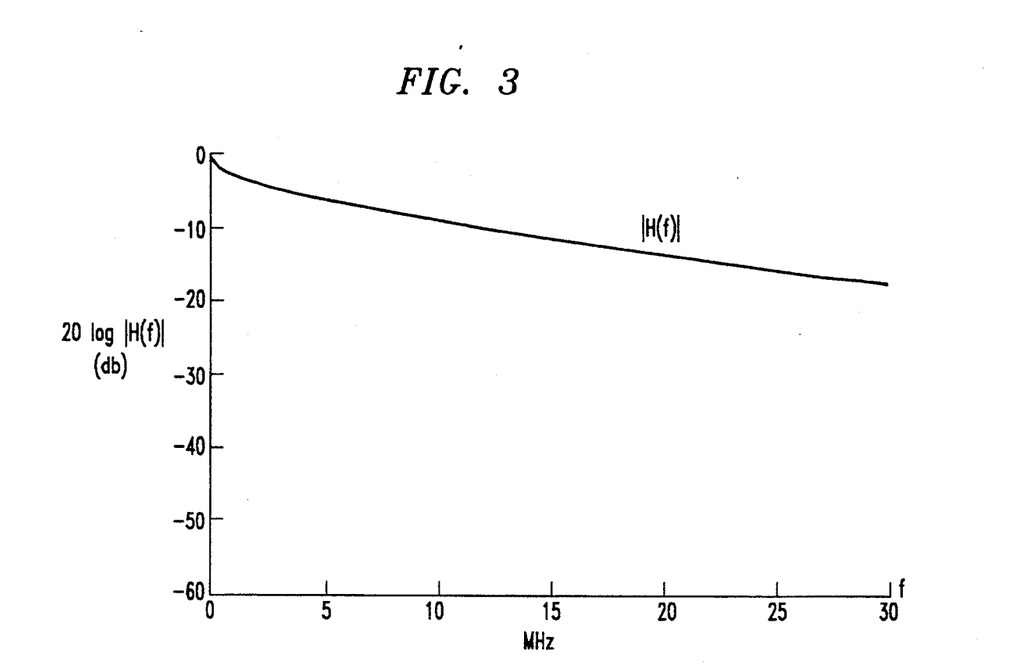
FIGS. 3 and 4 are illustrative transfer function plots for portions of the communications system of FIG. 2.
Figure 4:
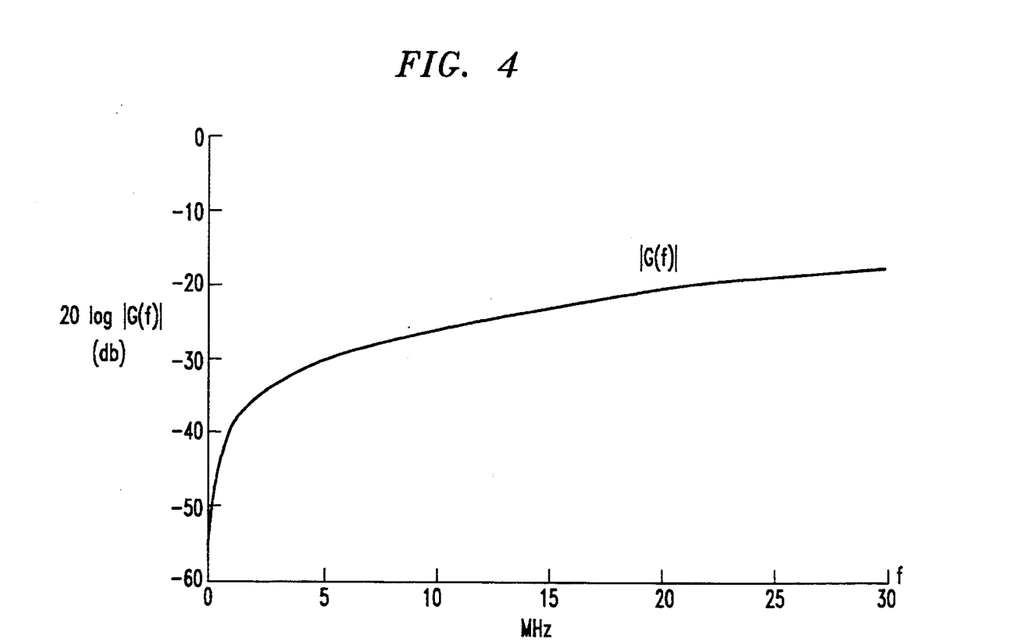

FIGS. 3 and 4 show representative transfer function log-magnitudes $20\log|H(f)|$ and $20\log|G(f)|$ respectively. (Upper-case functions in the variable $f$ are used to denote frequency-domain representations of time-domain signals and impulse responses, e.g., $H(f)$ denotes the Fourier transform of $h(t)$). Note that the direct channel transfer function magnitude $|H(f)|$ decreases with frequency, while, as mentioned earlier, the crosstalk transfer function magnitude $|G(f)|$ increases with frequency. A channel model having these qualitative direct and crosstalk characteristics will be referred to as a mottotonic channel. Of course, the fine details of $H(f)$, G(f) for a specific cable depend on the particular cable parameters; however, the monotonic channel model is qualitatively applicable to the communications system of the type depicted in FIG. 1.

As is known in the art, there is a minimum theoretical bandwidth required for distortionless transmission of linearly modulated signals such as a(t) and b(t), this minimum bandwidth being 1/T Hz. (Recall that T is the symbol interval and thus 1/T is the symbol rate.) This minimum required bandwidth is also known as the Nyquist bandwidth. In the 'classical' linearly-modulated data communication system in which the only additive impairment is stationary noise (but not cyclostationary crosstalk) it is well known that the theoretically optimum transmitter is Nyquist bandlimited, or, more correctly, has spectral support of just 1/T Hz. Furthermore, the spectral support set is comprised of those frequencies for which the signal-to-noise ratio (SNR) is largest.

Existing work in the field of cyclostationary equalization suggests that when the channel introduces significant additive cyclostationary crosstalk, then the theoretically optimum transmitter must have spectral support greater than Nyquist. However an analysis of what specific shape to use to obtain optimum or near-optimum performance over a given channel has not been forthcoming, and the prior art has no record of a formal closed form solution to this problem. Furthermore, classical Nyquist-equivalent transmitter filter shapes, such as the well-known raised-cosine, do not provide near-optimum performance in crosstalk over monotonic channels, even when such filters utilize large rolloff factors to provide wide transmitted bandwidth. Instead, and in accordance with the invention, it is necessary to employ transmitters which utilize distinct energy regions, resulting in transmit filtering arrangements for monotonic channels which are qualitatively dissimilar to transmitters for the classical noise-only channel.

Figure 5:
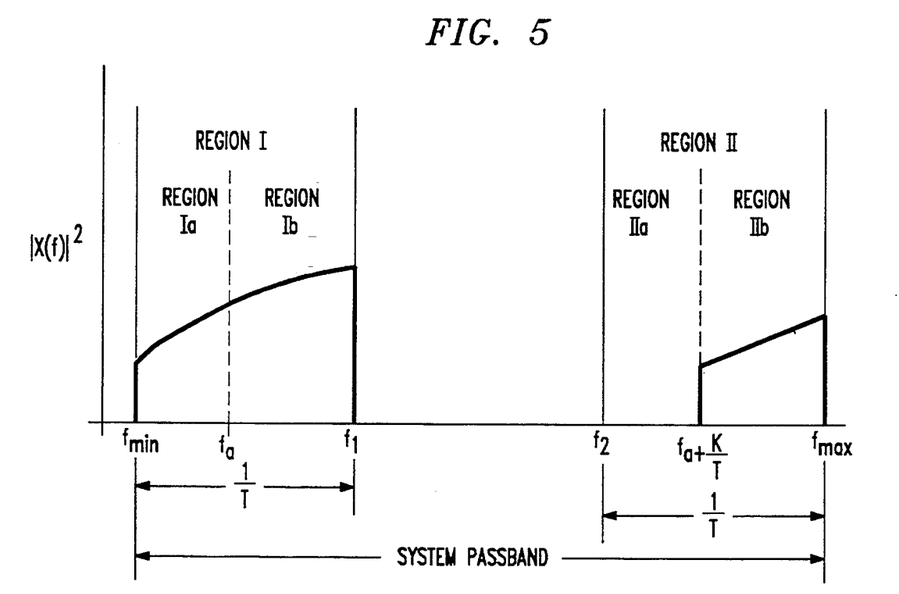
FIG. 5 is an illustrative transmitter shaping function embodying the principles of the invention.

FIG. 5 shows an example of a transmitter shaping function which, in accordance with the invention, is appropriate for use in a quadrature amplitude modulated (QAM) system operating over a monotonic channel. In order to properly explain why this shaping function achieves near-optimum performance, it is first necessary to briefly discuss certain aspects of the theory of equalization of cyclostationary signals.

Cyclostationary signals have a certain redundancy, namely that the underlying symbol sequence, i.e., the information content of the signal, can be reconstructed from any portion of the signal's spectrum which is at least 1/THz wide. The reason for this is that the symbol information within the spectrum is periodic in frequency: Loosely speaking, the information at a frequency $f_0$ is identical to the information at all Nyquist-spaced translates of $f_0$, i.e., $f_0 + k/T$, for any integer k, within the signal spectrum.

When such a signal is sampled at T-spaced intervals, as shown above in receiver 130, all the translates of each frequency add together, forming a sampled-data spectrum which is periodic in frequency with period 1/T. This is commonly referred to as 'spectral folding'. However, the adaptive filter 131 of receiver 130 operates on the received signal, s'(t), prior to sampling by sampler 135, and can, by adjusting its transfer function r(t), determine whether the folding of its output signal is constructive (i.e., the translates all add in the same direction) or destructive (the translates sum to zero, or 'cancel').

In the presence of crosstalk, receiver 130 sees the sum of two cyclostationary signals: the direct-channel signal s(t) and the crosstalk signal c(t). In minimizing the mean-squared-error, receiver 130 adaptively adjusts its transfer function r(t) so that at the sampler output, via lead 136, the spectral components of the direct-channel signal fold as constructively as possible, while simultaneously the components of the crosstalk fold so as to cancel each other as much as possible. An essential tradeoff in the folding process is that the cancellation of crosstalk engenders a certain unavoidable penalty in noise enhancement, that is, amplification of the stationary noise v(t).

At a given frequency, the degree to which the crosstalk can be cancelled without significantly enhancing the noise depends on the energy distribution amongst the Nyquist translates of that frequency, which in turn depends on the shape of the original transmitted spectrum. (Again, recall that the same transmitter shaping function x(t) is assumed to be used by both the desired signal transmitter and the crosstalking transmitter.)

A general observation in this regard is that an ideal FSE can cancel an additive synchronous cyclostationary interferer (such as crosstalk, in this case) without significantly enhancing the noise v(t) if, for all f, there exist integer translates $k_1$, $k_2$ such that $$\left| C\left(f + \frac{k_1}{T}\right) \right| >> \left| C\left(f + \frac{k_2}{T}\right) \right| \qquad (3a)$$

and $$\left| S\left(f + \frac{k_2}{T}\right) \right| >> \left| S\left(f + \frac{k_1}{T}\right) \right| \qquad (3b)$$

where $k_1$ and $k_2$ may be different for each f. An additional observation is that for those frequencies for which the quantity $$\theta(f) = \frac{N_0}{|G(f)|^2} \qquad (4)$$

is 'sufficiently large', it is not necessary to provide transmitted energy at additional translates in order to permit cancellation of the crosstalk, since at these frequencies, noise, rather than crosstalk, dominates the contribution to the MSE.

Loosely speaking then, for a given frequency $f_0$, the optimum transmitter either concentrates its energy only at $f_0$ (if $\theta(f_0)$ is sufficiently large) or it distributes its energy amongst the available translates of $f_0$ within the system passband so that the conditions (3) are as closely approximated as possible. As was previously mentioned, the analytical determination of the optimum NIIVISE transmitter for an arbitrary crosstalk channel is difficult at best, and in any case, the resulting shape depends on the channel parameters H(f), G(f) and $N_0$. For a given arbitrary set of channel parameters, there may not even exist a transmitter shape which results in efficient crosstalk mitigation at the receiver.

However, in accordance with the invention, it is possible to design and implement transmitters for monotonic channels which are easily realizable in practice, yet can provide near-optimal performance over a wide range of qualitatively similar channels by varying only a single design parameter. By allowing this parameter to be adjustable, such transmitters may be adaptively tuned for best performance over a particular monotonic channel, even if the channel characteristics are not precisely known. The design of such filters follows from the above intuitively oriented observations, but has also been proven in by detailed numerical analysis and simulations.

An illustrative example showing the shape of an idealized transmitted power spectrum is shown in FIG. 5. The transmitter places energy in only two spectral regions, labeled Region I and Region IIb. Region I extends from $f_{min}$ to $f_1$, where $f_{min}$ is the low-frequency limit of the system passband, and $f_1 = f_{min} + 1/T$ Hz. Region II extends from $f_2$ to $f_{max}$, where $f_{max}$ is the high-frequency limit of the system passband, and $f_2 = f_{max} - 1/T$ Hz. Region I is further subdivided into two regions, referred to as Region Ia and Region Ib. Region Ia is the 'noise-dominant region', and extends from $f_{min}$ to a threshold frequency $f_a$ (to be discussed below) where $f_{min} < f_a < f_1$. Region Ib is the 'crosstalk-dominant region', and extends from $f_a$ to $f_1$. Regions IIa and IIb are the Nyquist translates of Regions Ia and Ib respectively that lie within Region II.

Because of monotonicity, Region I is the Nyquist band within the passband of the system for which the direct channel transfer function magnitude is largest and the crosstalk channel transfer function magnitude is smallest. Similarly, Region II is the Nyquist band within the passband of the system for which the crosstalk channel transfer function magnitude is largest and the direct channel transfer function magnitude is smallest. Thus, for any frequency $f_0$, the situation described by (3) is always most closely approximated by depositing energy only at the translates of $f_0$ which lie in these two regions. Also by monotonicity, $\theta(f)$ will always be larger in Region I than in any other Nyquist region within the system passband. Consequently, as long as the channel is monotonic, the optimum MMSE transmitter needs to deposit energy only within Regions I and II.

Region Ia is that portion of Region I for which $\theta(f)$ is 'sufficiently large', i.e., the region for which the crosstalk need not be cancelled because its contribution to the MSE is smaller than that due to noise in that region. Thus, no energy needs to be placed at any translates of Region Ia in order to facilitate crosstalk cancellation. Region Ib is the region in which the effect of crosstalk is significant and requires cancellation. Thus, for all frequencies within Region Ib, the transmitter also allocates additional energy in Region IIb, so as to result in spectra at the receiver most closely approximating (3). This allows the FSE to perform crosstalk cancellation most efficiently.

Threshold frequency $f_a$ defines the boundary between Region Ia and Region Ib, and is an important design parameter. The location of $f_a$ depends primarily on $\theta(f)$: If $\theta(f)$ is sufficiently large for all f within Region I, then the system is effectively noise dominated, and $f_a = f_1$. In this case, Region Ib is of zero width, and consequently so is Region IIb. Thus, in this noise-dominated case, the optimum transmitter is Nyquist bandlimited, and deposits energy only in Region I, where $H(f)/N_0$ is largest. This result is consistent with the well-known optimum transmitter energy allocation for the classical additive-noise-only channel.

On the other hand, if $\theta(f)$ is sufficiently small for all f within Region I, then crosstalk is the dominant additive impairment, and $f_a = f_{min}$. In this crosstalk-dominated case, Region Ia is of zero width, Region Ib covers Region I, and Region IIb covers Region II. Now, the optimum transmitter thus has two distinct energy bands, with total spectral support of twice the Nyquist bandwidth. For intermediate values of $\theta$, $f_a$ lies between $f_{min}$ and $f_1$, and the optimum transmitter has total spectral support greater than Nyquist but less than twice Nyquist.

So far, the discussion has concerned only the regions in which the transmitted energy is to be placed, but has not mentioned the shape of the energy distribution within the regions. However, it has been found that the best performance generally results when $|x(f)|$ is approximately proportional to $$\frac{1}{|H(f)|^{\frac{1}{2}}}$$

in those Regions where X(f) is nonzero. (This is the approximate magnitude shape depicted for $|X(f)|$ in FIG. 5.) However, for efficient mitigation of crosstalk, the exact details of the shape are considerably less important than the presence of significant energy in the appropriate Regions, as described above.

Figure 6:
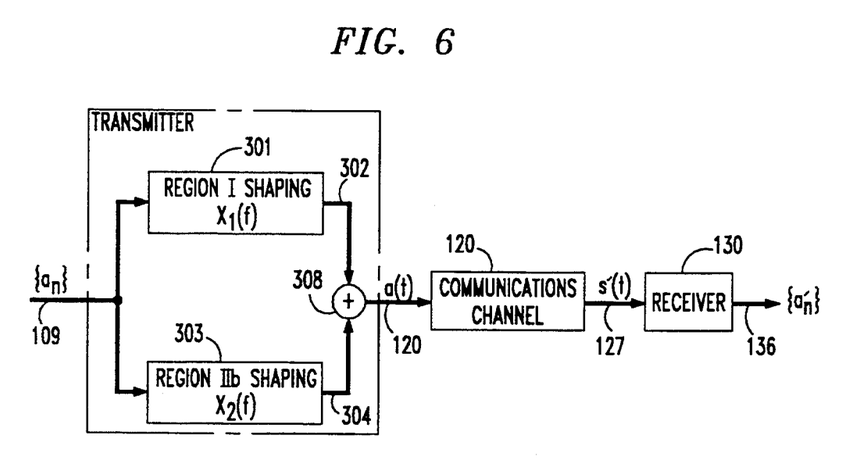
FIG. 6 is a block diagram of a communications system embodying the principles of the invention.

An embodiment of the invention is shown in FIG. 6. FIG. 6 depicts QAM-like transmitters which form their signals directly in passband format rather than modulating a baseband signal. This is sometimes referred to as 'combined amplitude-modulation and phase-modulation', or CAMPM, and is preferred here for reasons of simplicity—it is essentially equivalent to QAM. Also for simplicity, the analytic equivalent-channel continues to be assumed.

Figure 7:
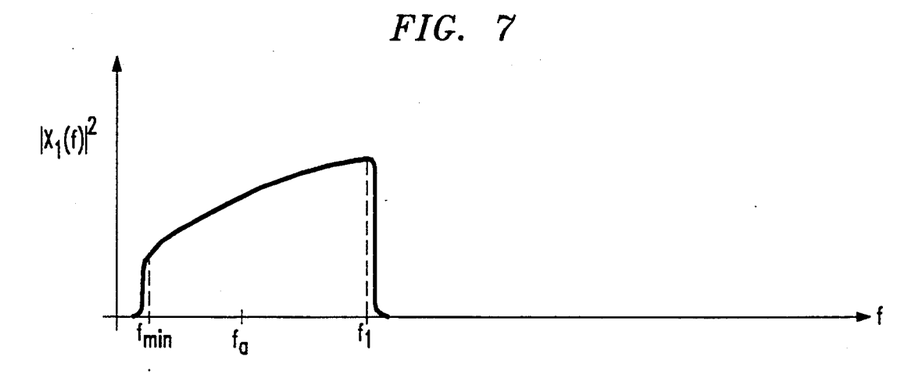
FIGS. 7 and 8 are illustrative transfer function plots for portions of the communications system of FIG. 6.
Figure 8:
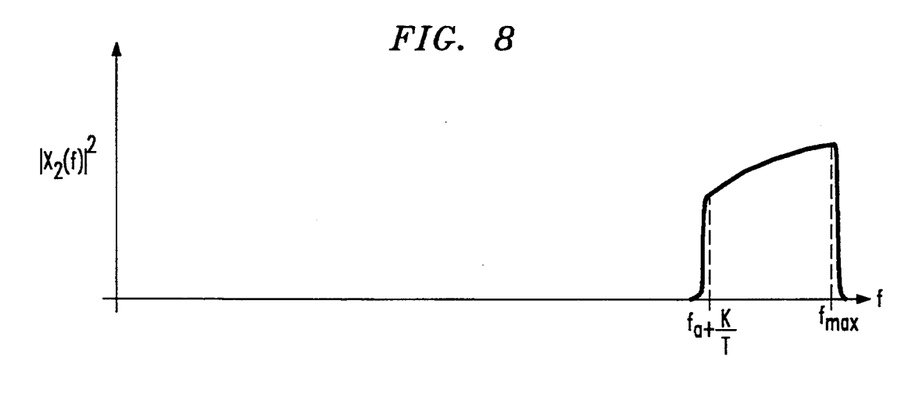

Input data sequence $\{a_n\}$ is applied simultaneously to passband shaping filters 301 and 303, via lead 109. Shaping filter 301 has transfer function magnitude as shown in FIG. 7. Thus, the output signal from filter 301 on lead 302, has energy substantially restricted to Region I. Shaping filter 303 has transfer function magnitude as shown in FIG. 8, and thus its output on lead 304 consequently has energy substantially restricted to Region IIb. In order to minimize the required time span of the adaptive filter in receiver 130, the group delays of filters 301 and 303 are closely matched.

Figure 9:
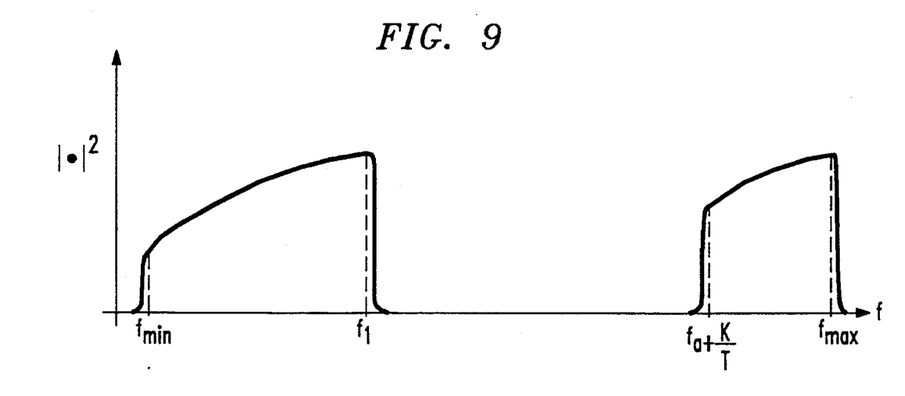
FIG. 9 is an illustrative power spectrum plot of the transmitted signal of the communications system of FIG. 6.

The outputs of shaping filters 301 and 303 are applied to adder 308. The latter sums the signals on leads 302 and 304 to provide a signal for transmission, a(t), on lead 311 that is applied to communications channel 120 for transmission to receiver 130. The power spectrum of the transmitted signal, a(t), is shown in FIG. 9.

Figure 10:
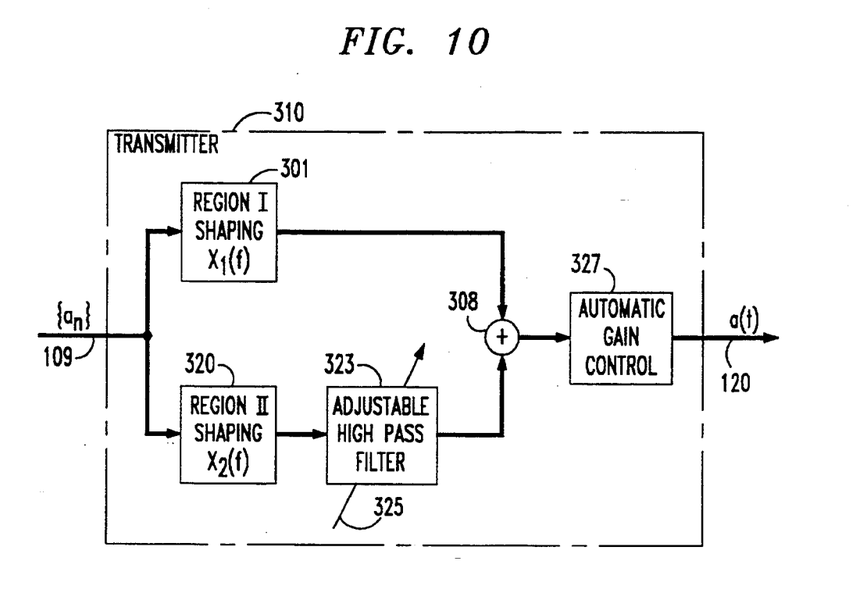
FIG. 10 is a block diagram of another communications system embodying the principles of the invention.
Figure 11:
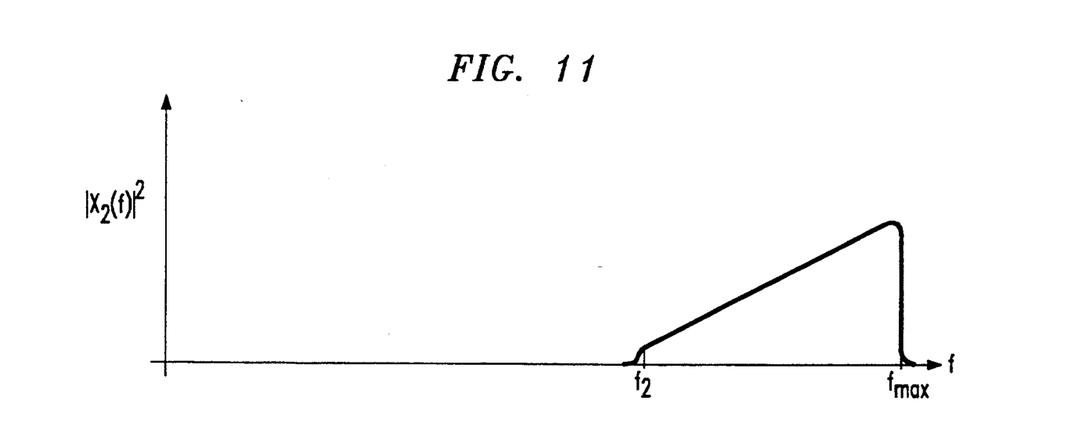
FIG. 11 is an illustrative transfer function for a portion of the communications system of FIG. 10.

In the above embodiment, shaping filter 303 is fixed, and is thus appropriate only if $f_a$ is known in advance. A preferred embodiment of the invention, featuring a means for adjusting $f_a$, is shown in FIG. 10. FIG. 10 is similar to FIG. 6, except that shaping for Region IIb is now performed by the cascade of shaping filter 320 followed by adjustable high-pass filter 323, and the output of adder 308 is followed by automatic gain control 327. Shaping filter 320 has transfer function magnitude as shown in FIG. 11. The cutoff frequency of high-pass filter 323 is adjusted by control 325, and can be varied from $f_2$ to $f_{max}$. Thus, the setting of control 325 determines the effective $f_a$ for the transmitter. Automatic gain control 327 normalizes the output power from adder 308 so that control 325 may be adjusted without affecting the average transmitted power.

The embodiment of FIG. 10, by providing a means for adjusting the design parameter $f_a$, thus allows the transmitter to obtain near-optimum performance over a fairly wide range of monotonic channels. Furthermore, since there is only a single adjustment, the optimum setting for control 325 may be adaptively determined in a very simple manner, e.g. by adjusting $f_a$ so as to obtain the smallest MSE at the receiver output.

The foregoing merely illustrates the principles of the invention and it will thus be appreciated that those skilled in the art will be able to devise numerous alternative arrangements which, although not explicitly described herein, embody the principles of the invention and are within its spirit and scope. For example, Region IIb may be comprised of disjoint frequency regions. Furthermore, the frequency range between Region I and Region IIb need not be completely void of transmitted energy.

I claim:

1. Apparatus for transmitting a sequence of data symbols occurring at a rate of 1/T symbols/second, over a communications channel, the apparatus comprising:

means for accepting the sequence of data symbols; and transmitter means responsive to the accepted sequence of data symbols for placing energy from each symbol into a first spectral region and a second spectral region to provide an output signal to the communications channel;

where the first spectral region bandwidth is at least 1/T Hz and the second spectral region is of bandwidth p/T Hz, the second spectral region being disjoint from the first spectral region, where $1<p<1$, and where the first spectral region includes an interference spectral region and the second spectral region is located a Nyquist multiple from the interference spectral region.

2. The apparatus of claim 1, where the interference spectral region is a crosstalk dominant region from an interfering cyclostationary signal having a rate of 1/T symbols/second.

3. Apparatus for transmitting a signal on a communications channel, the communications channel introducing an interfering cyclostationary signal having a rate of 1/T symbols/second, the apparatus comprising:

means responsive to a sequence of data symbols for providing a first signal, said sequence of data symbols occurring at a rate of 1/T symbols/second, and said first signal having energy substantially in a first frequency range of bandwidth at least 1/T Hz;

means responsive to the sequence of data symbols for providing a second signal, said second signal having energy substantially in a second frequency range of width p/T Hz, that is disjoint from the first frequency range, where $0<p<1$; and means for combining the first signal and the second signal to provide a transmitted signal to the communications channel;

where the first frequency range includes an interference region representative of the interfering cyclostationary signal and the second frequency range is located at a Nyquist multiple from the interference region.

4. The apparatus of claim 3 further comprising means for varying the bandwidth of the second frequency range.

5. The apparatus of claim 4 further comprising means for controlling the output power of the combined signal.

6. Apparatus for use in a communications system comprising:

means for accepting from the communications channel a data signal and an interfering cyclostationary signal that is frequency synchronous to the data signal, the data signal representing a sequence of data symbols occurring at a rate of 1/T symbols/second; and means for equalizing the accepted data signal and the accepted interfering cyclostationary signal to provide the sequence of data symbols;

where the data signal is a cyclostationary signal and comprises energy in a first frequency band and a second frequency band that is disjoint from the first, the second frequency band comprising a range of frequencies that are located at Nyquist multiples from a portion of the frequency band of said interfering cyclostationary signal, whereby equalization of the accepted data signal and the accepted interfering cyclostationary signal mitigates the interference caused by said interfering cyclostationary signal.

7. The apparatus of claim 6 wherein the portion of the frequency band of the interfering cyclostationary signal contains substantial energy of the interfering cyclostationary signal.

8. A method for transmitting a sequence of data symbols occurring at a rate of 1/T symbols/second, over a communications channel, the method comprising the steps of:

accepting the sequence of data symbols;

placing energy from each accepted symbol into a first spectral region and a second spectral region, where the second spectral region is disjoint from the first spectral region; and providing an output signal representative of the accepted sequence of data symbols to the communications channel, the output signal comprising the energy placed into the first and second spectral regions;

where the first spectral region bandwidth is at least 1/T Hz and the second spectral region is of bandwidth p/T Hz, where $0<p<1$, and where the first spectral region includes an interference spectral region and the second spectral region is located a Nyquist multiple from the interference spectral region.

9. The method of claim 8, where the interference spectral region is a crosstalk dominant region from an interfering cyclostationary signal having a rate of 1/T symbols/second.

10. A method for mitigating the interference from a cyclostationary signal occurring at a rate of 1/T symbols/second that is present on a communications channel, the method comprising the steps of:

accepting a sequence of data symbols occurring at rate 1/T symbols/second;

providing a first signal representative of the accepted sequence of data symbols, where the energy of the first signal is substantially within a first frequency band of bandwidth at least 1/T Hz;

providing a second signal in response to the sequence of data symbols, where the energy of the accepted second signal is substantially in a second frequency band of bandwidth p/T Hz, where $0<p<1$, the second frequency band being disjoint from the first frequency band; and combining the first signal and the second signal for transmission on the communications channel.

where the first frequency range includes an interference region representative of the interfering cyclostationary signal and the second frequency range is located at a Nyquist multiple from the interference region.

11. The method of claim 10 further comprising the steps of:

receiving the transmitted first and second signals and the interfering cyclostationary signal; and equalizing the received transmitted first and second signals, and the received interfering cyclostationary signal to provide an output sequence representative of the sequence of data symbols, whereby the equalization substantially removes the interference caused by the interfering cyclostationary signal.

12. A method for use in a communications system comprising the steps of:

receiving from the communications channel a data signal and an interfering cyclostationary signal that is frequency synchronous to the data signal, the data signal representing a sequence of data symbols occurring at a rate of 1/T symbols/second; and equalizing the received data signal and the received interfering cyclostationary signal to provide the sequence of data symbols;

where the data signal is a cyclostationary signal and comprises energy in a first frequency band and a second frequency band that is disjoint from the first, the second frequency band comprising a range of frequencies that are located at Nyquist multiples from a portion of the frequency bandwidth of said interfering cyclostationary signal, whereby equalization of the received data signal and the received interfering cyclostationary signal mitigates the interference caused by said interfering cyclostationary signal.

* * * * *